United States Patent
Leah et al.

(10) Patent No.: US 10,096,843 B2
(45) Date of Patent: Oct. 9, 2018

(54) INTERCONNECT

(71) Applicant: Ceres Intellectual Property Company Limited, Horsham (GB)

(72) Inventors: Robert Leah, Horsham (GB); Ahmet Selcuk, Horsham (GB)

(73) Assignee: Ceres Intellectual Property Company Limited, Horsham (GB)

(*) Notice: Subject to any disclaimer, the term of this patent is extended or adjusted under 35 U.S.C. 154(b) by 22 days.

(21) Appl. No.: 14/641,745

(22) Filed: Mar. 9, 2015

(65) Prior Publication Data

US 2016/0233524 A1 Aug. 11, 2016

(30) Foreign Application Priority Data

Feb. 10, 2015 (GB) .................................. 1502197.5

(51) Int. Cl.
| | |
|---|---|
| *H01M 8/2425* | (2016.01) |
| *H01M 8/241* | (2016.01) |
| *H01M 8/24* | (2016.01) |
| *H01M 8/0228* | (2016.01) |
| *H01M 8/021* | (2016.01) |
| *C23C 8/10* | (2006.01) |
| *H01M 8/0215* | (2016.01) |
| *H01M 8/124* | (2016.01) |

(52) U.S. Cl.
CPC ............. *H01M 8/0228* (2013.01); *C23C 8/10* (2013.01); *H01M 8/021* (2013.01); *H01M 8/0215* (2013.01); *H01M 2008/1293* (2013.01); *Y02P 70/56* (2015.11)

(58) Field of Classification Search
None
See application file for complete search history.

(56) References Cited

U.S. PATENT DOCUMENTS

| | | | | |
|---|---|---|---|---|
| 5,733,682 A | * | 3/1998 | Quadakkers | ........ H01M 8/0204 |
| | | | | 429/210 |
| 5,942,349 A | | 8/1999 | Badwal | |

(Continued)

FOREIGN PATENT DOCUMENTS

| | | |
|---|---|---|
| DE | 10306649 | 9/2004 |
| EP | 1555709 | 7/2005 |

(Continued)

OTHER PUBLICATIONS

Feng et al., "Preparation and high temperature performances of DyCrO3-based coatings on a ferritic stainless steel interconnect material", Journal of Power Sources, vol. 235, 2013, pp. 54-61.

(Continued)

*Primary Examiner* — Yoshitoshi Takeuchi
(74) *Attorney, Agent, or Firm* — Snell & Wilmer L.L.P.

(57) ABSTRACT

An interconnect for a low temperature solid oxide fuel cell, the interconnect comprising: a stainless steel substrate comprising a first surface and a second surface; a layer comprising chromium oxide on the first surface of the substrate, wherein the chromium oxide layer has a thickness in the range of 350-600 nm; and a metal oxide coating on the chromium oxide layer. A process for making an interconnect for a low temperature solid oxide fuel cell, the process comprising: coating a first surface of a stainless steel substrate with a metal oxide to form a coated substrate; and heating the coated substrate to a temperature in the range of 800-900° C. to form a layer comprising chromium oxide between the first surface and the metal oxide coating.

17 Claims, 8 Drawing Sheets

(56) References Cited

U.S. PATENT DOCUMENTS

| | | |
|---|---|---|
| 2006/0099442 A1 | 5/2006 | Tietz |
| 2010/0055533 A1 | 3/2010 | Kebbede |
| 2013/0040220 A1* | 2/2013 | Kim .................. C22C 38/18 |
| | | 429/468 |
| 2013/0230792 A1* | 9/2013 | Wilson ............... H01M 8/0208 |
| | | 429/509 |
| 2014/0048183 A1* | 2/2014 | Chou ................. H01M 8/1246 |
| | | 148/285 |

FOREIGN PATENT DOCUMENTS

| | | |
|---|---|---|
| EP | 2557194 A1 | 9/2011 |
| JP | 201407490 A | 1/2014 |
| WO | 2009017841 | 2/2009 |
| WO | 2010030300 | 3/2010 |

OTHER PUBLICATIONS

Montero et al., "Evaluation of commercial alloys as cathode current collector for metal-supported tubular solid oxide fuel cells", Corrosion Science, vol. 51, 2011, pp. 110-118.

Hua et al., "A promising NiCo2O4 protective coating for metallic interconnects of solid oxide fuel cells", Journal of Power Sources, vol. 195, 2010, pp. 7375-7379.

Search Report, dated May 5, 2015.

Written Opinion by the Intellectual Property Office of Singapore dated May 4, 2018 in the International Application No. 11201706478W.

\* cited by examiner

INTERCONNECT

FIELD

The invention relates to an interconnect for a low temperature solid oxide fuel cell, in particular to an interconnect comprising a chromium oxide layer (chromium (III) oxide/chromia). A process for making the interconnect, fuel cell stacks including the interconnect and their use in the generation of electrical energy are also described.

BACKGROUND

A solid oxide fuel cell (SOFC) is an electrochemical device for the generation of electrical energy through the electrochemical oxidation of a fuel gas (usually hydrogen-containing). The device typically uses an oxygen-ion conducting metal-oxide derived ceramic as its electrolyte. Single fuel cells are connected via interconnects to form fuel cell stacks. The interconnect provides gas flow paths to and from the cell, and carries electrical current away from the cells.

An effective interconnect should be gas impermeable, to prevent mixing of the oxidant on one side of the interconnect with fuel on the other side of the interconnect; have high electrical conductivity, to allow transfer of the electric current away from the cell, with a low contact resistance at the interconnect/electrode interface. Further, a high thermal conductivity is desirable to allow the transfer of heat away from the individual cells, and to evenly distribute the heat loading within the stack of fuel cells thereby reducing thermal stresses associated with changes in temperature in a fuel cell layer and within the stack of fuel cells. In addition, the interconnect should have a similar thermal expansion co-efficient to the cell components, to minimise mechanical stress during cycling. The interconnect should also be stable to the conditions found in the stack, for instance by having good chemical stability relative to the fuel and oxidant, and good mechanical stability at operation temperatures. Further, the interconnect and the metal supported fuel cell substrate should have well matched thermal expansion characteristics over the operating temperature range during operation of the fuel cell. The interconnect should also allow for simple methods of joining to the metal supported fuel cell substrate, to enable a gas tight seal to be formed and to allow for efficient current transfer and a robust join over the life of the metal supported fuel cell and stack. This joining is simply done by welding the interconnect to the metal substrate, such as laser welding the interconnect to the fuel side of the metal supported substrate.

SOFC's typically operate at temperatures in the range 700-900° C., however, such high temperature operation results in long start up times, and the need to use specialist materials that are robust to long term exposure to high temperatures. SOFC's that can operate at lower temperatures (for instance, less than 650° C.) have been developed by the applicant as exemplified by their patent number GB 2,368,450 which describes a metal-supported SOFC.

However, a problem associated with low temperature SOFC's is the slow formation of a passivating chromium oxide scale on the metal components (for instance, on the stainless steel substrates and interconnects). The scale forms a protective layer on the steel, preventing corrosion. At temperatures below 650° C., the rate of chromium diffusion from a steel to its surface is low. In addition, where the steel surface is exposed to flowing humidified air (as is often the case) such as on the oxidant side of the interconnect during operation of the fuel cell, the slow formation of the chromium oxide scale may result in it evaporating faster than it is formed, leaving the steel unprotected. Further, under the operating environment of a metal supported SOFC interconnect, the corrosion of the steel may be accelerated on the oxidant side (the side exposed to air), as hydrogen may diffuse through the steel from the fuel side of the interconnect. This promotes the formation of iron oxides on the oxidant side of the steel causing corrosion of the interconnect steel instead of passivation.

In view of this, it has been proposed to protect the interconnects in a low temperature SOFC stack from corrosion by providing an interconnect plate which is made of ferritic stainless steel, that is coated on the oxidant side, the coating preventing chromium evaporation from the surface. However, whilst this method has the benefit that contact resistance remains acceptably low, the formation of the chromia layer remains unpredictable, and so corrosion of the steel, particularly in the interconnect region can still occur. The invention is intended to overcome or ameliorate at least some aspects of this problem.

SUMMARY

Objects and advantages of the invention will be set forth in part in the following description, or may be obvious from the description, or may be learned through practice of the invention.

An interconnect for a low temperature solid oxide fuel cell is generally provided. In one embodiment, the interconnect comprises: a stainless steel substrate comprising a first surface and a second surface; a layer comprising chromium oxide on the first surface of the substrate, wherein the chromium oxide layer has a thickness in the range of 350 nm to 600 nm; and a metal oxide coating on the chromium oxide layer.

A process is also generally provided for making an interconnect for a low temperature solid oxide fuel cell. In one embodiment, the process comprises: a) coating a first surface of a stainless steel substrate with a metal oxide to form a coated substrate; and b) heating the coated substrate to a temperature in the range of 800° C. to 920° C. to form a layer comprising chromium oxide between the first surface and the metal oxide coating.

Other features and aspects of the present invention are discussed in greater detail below.

BRIEF DESCRIPTION OF THE DRAWINGS

In order that the invention may be more readily understood, it will be described further with reference to the figures and to the specific examples hereinafter.

DETAILED DESCRIPTION

Figure 1:
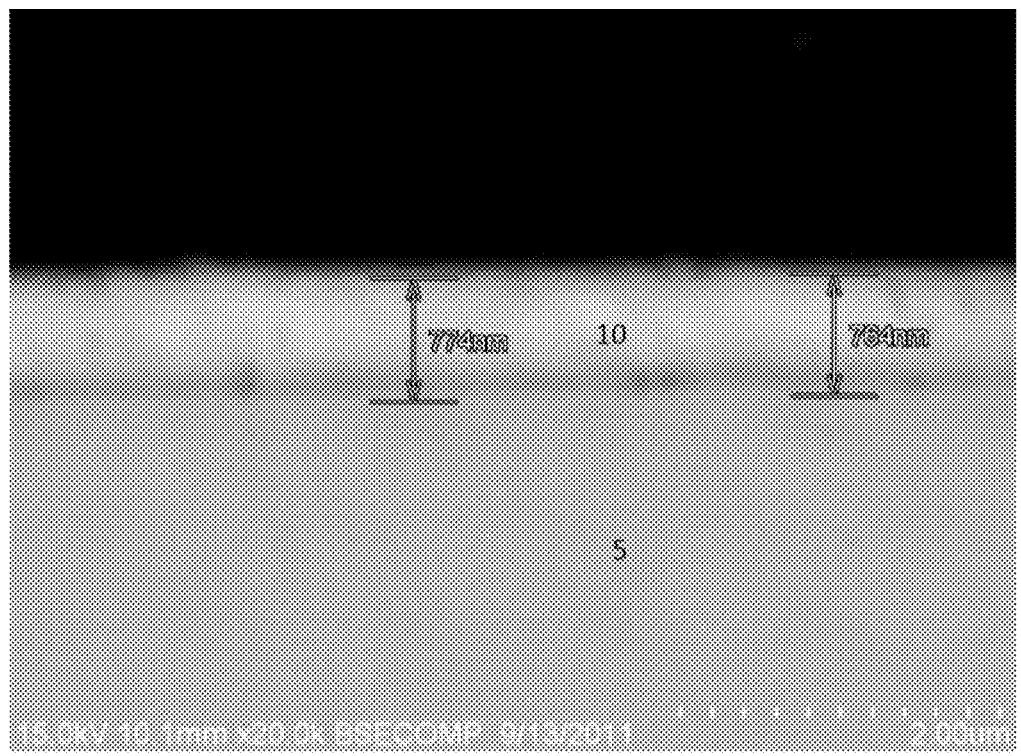
FIG. 1 shows an SEM cross section of cobalt-coated interconnect steel as received before heat treatment.

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Accordingly, in a first aspect of the invention there is provided an interconnect for a low temperature solid oxide fuel cell, the interconnect comprising:

- a stainless steel substrate comprising a first surface and a second surface;
- a layer comprising chromium oxide on the first surface of the substrate, wherein the chromium oxide layer is of thickness in the range 350-600 nm; and
- a metal oxide coating on the chromium oxide layer.

For the avoidance of doubt, as used herein the term "low temperature solid oxide fuel cell" is intended to refer to a solid oxide fuel cell which operates at a temperature in the range 450-650° C., more often in the range 500-620° C., or 520-570° C. This is as opposed to conventional solid oxide fuel cells which operate at temperatures in excess of 650° C., often in excess of 700° C. The interconnect is protected from corrosion by the chromium oxide layer. The prevention of corrosion ensuring that structural integrity of the interconnect is maintained during the lifetime of the fuel cell stack. This allows the interconnect to perform its support function, and minimises porosity of the interconnect, ensuring that the fuel and oxidant gases cannot mix.

The interconnect above has the advantage in that it overcomes a problem of low temperature SOFC operation, in that current collection on the cathode side is typically through the chromium oxide layer on the steel adjacent the interconnect. As chromia is a semi-conductor, its electronic conductivity increases exponentially with increasing temperature. Thus, at the operating temperatures of low temperature SOFC's the resistance of a given thickness of chromia will be many times that observed at conventional higher temperature SOFC operating temperatures. It therefore becomes increasingly important in low temperature systems that the chromia scale is no thicker than necessary to protect the steel. The applicant has found that an optimum balance of corrosion protection relative to resistance is in the range 350-600 nm, often 350-500 nm, or 350-450 nm.

As used herein the term "layer" is intended to refer to complete layers of the substance described, such that where the layer is a coating, the coating will cover substantially all of the layer to be coated, or where the layer is an intermediate layer, it will separate the layers either side such that they are not in direct contact with one another. As such, a layer may comprise a 100% covering, often at least a 99% covering.

Where we refer to a layer or coating as being "on" a surface, or similar, this is generally intended to mean in direct physical or chemical contact with the surface, there being no intermediate layers or substances. However, it is possible, in some cases that contact be indirect, and the presence of intervening layers is not specifically excluded.

It will often be the case that the chromium oxide layer is an oxide scale, as whilst a chromium oxide layer could be applied to the steel (for instance where the steel substrate is a low chromium steel), the provision of a separate layer introduces an undesirable manufacturing complexity, which can be avoided by exploitation of the oxide scale which forms naturally under cell operating conditions. As used herein the term "scale" is intended to mean a layer comprised of plates of material, as would be understood is common for chromia scales in the art.

Often, the interconnect will further comprise an aluminium oxide (alumina) layer on the second surface of the substrate. It will often be the case that the first surface of the substrate is to be found on the air/oxidant side of the interconnect, and the second surface of the substrate is found on the fuel side of the interconnect. The presence of the alumina layer prevents the formation of a chromia scale on the second surface of the substrate. The alumina layer provides resistance to corrosion from carbon-containing gases in the fuel, and inhibits the diffusion of hydrogen into the steel, thus providing some corrosion protection to the air-facing side.

Typically the steel, or stainless steel will comprise 17-25 wt % chromium, this allows for the formation of a stable chromium oxide layer, through diffusion of the chromium to the surface of the steel. Often, a ferritic stainless steel will be used, for instance of the grade SS441, SS444, SS430, Sandvik Sanergy HT, VDM Crofer 22APU, VDM Crofer 22H, or Hitachi ZMG232.

Often the metal oxide comprises a metal oxide selected from cobalt oxide, manganese cobalt oxide, copper oxide or combinations thereof. Often the coating will be cobalt oxide, as at low temperatures (<900° C.), cobalt oxide is significantly more conductive than chromia, tends to form dense layers (thus preventing chromium evaporation), is not thought to be poisonous to the fuel cell cathode and does not react with the steel substrate of the metal supported fuel cell. It can also be formed by the oxidation of metallic cobalt, whereas more complex oxides (usually manganese-cobalt mixed oxides) can be harder to deposit in metallic form. However, any electrically conductive, non-volatile coating which can be made sufficiently dense to prevent chromium evaporation from the surface of the steel may be used. Ceria may be added to the coating, and has the advantage that it inhibits the oxide growth kinetics allowing the use of steel substrates containing lower concentrations of chromium. Often the metal oxide coating is of thickness in the range 0.5-20 μm, at these thicknesses chromium evaporation can be prevented, without unnecessarily increasing the thickness of the interconnect structure.

A cathode contact paste or contact layer could be applied to the interconnect of the invention in instances where a reduction in the contact resistance between the interconnect and the cathode of the SOFC is required.

In a second aspect of the invention there is provided a process for making an interconnect for a low temperature solid oxide fuel cell, the process comprising:
    coating a first surface of a stainless steel substrate with a metal oxide to form a coated substrate; and
    heating the coated substrate to a temperature in the range 800-920° C., often 800 890° C. to form a layer comprising chromium oxide between the first surface and the metal oxide coating. These temperature ranges have been found to be of use as within these ranges the formation of large spinel crystals on the surface (which raise contact resistance) is avoided. In addition, at higher temperatures cobalt oxide, where used, begins to decompose. Formation of the chromium oxide layer, generally a chromia scale layer, after coating with the metal oxide prevents evaporation of the chromia layer, as the coating offers protection to the nascent chromium oxide layer. Heating the substrate to a temperature significantly in excess of the SOFC operating temperature ensures the controlled, rapid, development of the chromium oxide layer underneath the metal oxide coating. Relying simply on layer formation during operation could result in an uneven layer, which may not form immediately upon first operation of the stack, the delay leading to oxidation (i.e. rusting) of the substrate This could lead to reduced electrical conductivity of the interconnect and so reduced current collection.

Often the coated substrate is heated for a time in the range 3-6 hours. Heating for this time is sufficient to ensure formation of the chromium oxide layer, without degradation to the components of the interconnect and can be advantageous from a manufacturing point of view as the process can be run overnight or within a typical shift pattern, with the furnace being cool enough to open and reload for the next shift. However, the optimal heating time will depend upon the steel substrate and will change from batch to batch.

The coating may be applied using one of many known methods, including a method selected from, vapour deposition, printing, roll-to-roll processing, spray coating, or combinations thereof. Often the method used will be as described in US 2009/0029187 (Schuisky et al.), the subject matter of which is herein incorporated by reference in its entirety in as far as it relates to the method of producing the product. For instance, the method may comprise providing a metallic layer and a reactive layer on the stainless steel substrate, allowing the metallic layer and reactive layer to react with each other or diffuse into each other, and oxidising the metallic layer and reactive layer to form the metal oxide coating.

The coating of the first surface of the stainless steel substrate with the metal oxide forms a coated substrate, which may then either be processed to provide a coated interconnect form, which is then heated as described, or which is heated as described, prior to processing to form the interconnect from the heat treated coated substrate.

In a third aspect of the invention there is provided an interconnect made using the process according to the second aspect of the invention. In a fourth aspect, there is provided a fuel cell stack comprising at least one interconnect according to the first aspect of the invention. Often, in the fuel cell stack, the metal oxide coating is in contact with the air supplying the fuel cell. In a fifth aspect of the invention, there is provided the use of a fuel cell stack of the fourth aspect of the invention in the generation of electrical energy.

An interconnect for a low temperature solid oxide fuel cell, the interconnect comprising:
    a stainless steel substrate comprising a first surface and a second surface, wherein the stainless steel comprises 17-25 wt % chromium, and is a ferritic stainless steel;
    a layer comprising chromium oxide on the first surface of the substrate, wherein the chromium oxide layer is an oxide scale of thickness in the range 350-600 nm;
    a metal oxide coating on the chromium oxide layer, wherein the metal oxide is selected from cobalt oxide, manganese cobalt oxide, copper oxide or combinations thereof and is of thickness in the range 0.5-20 μm; and
    an aluminium oxide layer on the second surface of the substrate.

A process for making an interconnect for a low temperature solid oxide fuel cell, the process comprising:
    coating a first surface of a stainless steel substrate to be used for the interconnect with a metal oxide using a method selected from, vapour deposition, printing, roll-to-roll processing, spray coating, or combinations thereof to form a coated substrate; and
either forming the interconnect from the coated interconnect substrate to generate a coated interconnect form; and then
    heating the coated interconnect form to a temperature in the range 800-920° C. for a time in the range 3-6 hours to form a layer comprising chromium oxide between the first surface and the metal oxide coating; or
    heating the coated substrate to a temperature in the range 800-920° C. for a time in the range 3-6 hours to form a layer comprising chromium oxide between the first surface and the metal oxide coating; and then
forming the interconnect from the heat treated coated substrate.

Unless otherwise stated each of the integers described may be used in combination with any other integer as would be understood by the person skilled in the art. Further, although all aspects of the invention preferably "comprise" the features described in relation to that aspect, it is specifically envisaged that they may "consist" or "consist essentially" of those features outlined in the claims. In addition, all terms, unless specifically defined herein, are intended to be given their commonly understood meaning in the art.

Further, in the discussion of the invention, unless stated to the contrary, the disclosure of alternative values for the upper or lower limit of the permitted range of a parameter, is to be construed as an implied statement that each intermediate value of said parameter, lying between the smaller and greater of the alternatives, is itself also disclosed as a possible value for the parameter.

In addition, unless otherwise stated, all numerical values appearing in this application are to be understood as being modified by the term "about".

EXAMPLES

Figure 2:
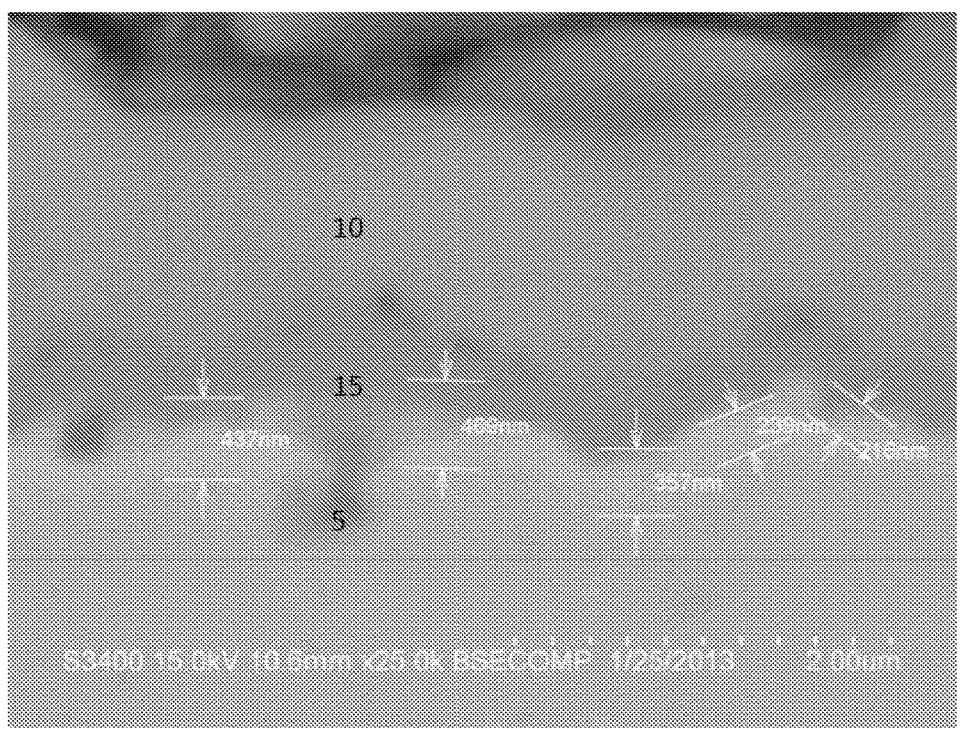
FIG. 2 shows an SEM cross section of the interconnect steel of FIG. 1 after the heat treatment process, the interconnect comprising a 350 nm layer of chromium oxide.
Figure 3:
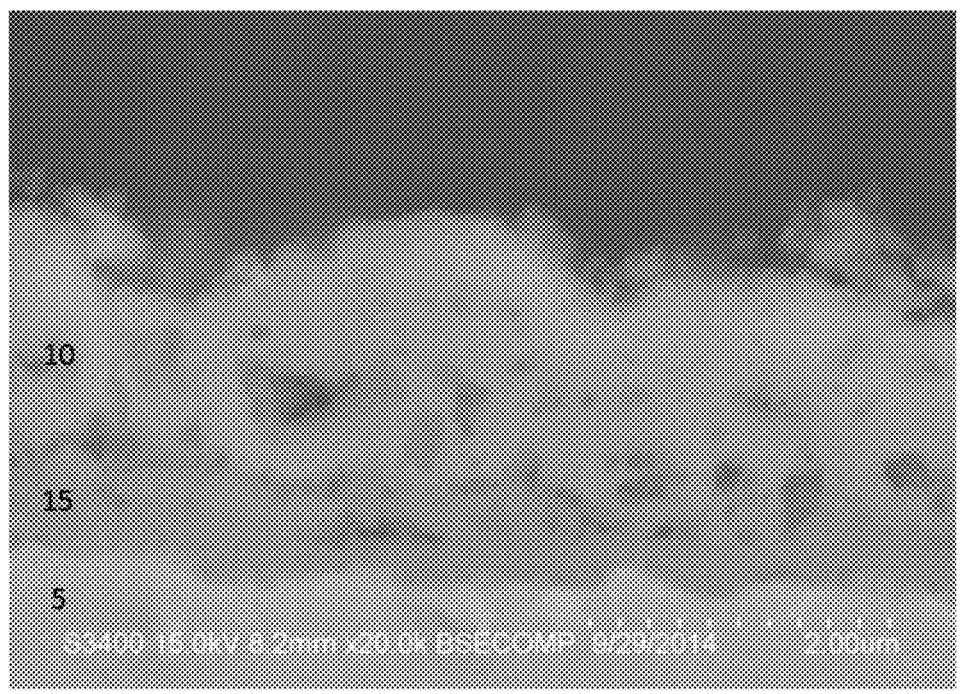
FIG. 3 shows an SEM cross section of the cathode (air) side of an interconnect made of steel from the same batch as that illustrated in FIG. 2 after 8600 h (approx. 1 year) of continuous stack operation at 570° C.

FIG. 1 shows a steel interconnect 1 comprising ferritic stainless steel layer 5, with a cobalt oxide spinel coating 10. FIG. 2 shows that a chromium oxide layer 15 is formed upon heat treatment of the cobalt coated spinel coated ferritic stainless steel of FIG. 1 at a temperature in the range 870° C. for 4 hours. The chromia scale 15 is of thickness 350 nm. FIG. 3 shows the interconnect 1 of FIG. 2 after operation for a year, as can be seen, the chromium oxide layer 15 remains intact, and has not grown, indicating that the steel base structure 5 also remains intact and is not corroded during use. The main difference between FIG. 2 and FIG. 3 is that continuous use of the interconnect has induced some porosity in the metal oxide layer 10, however, there is no sign of corrosion to the interconnect 1 and so this porosity is acceptable.

Figure 4:
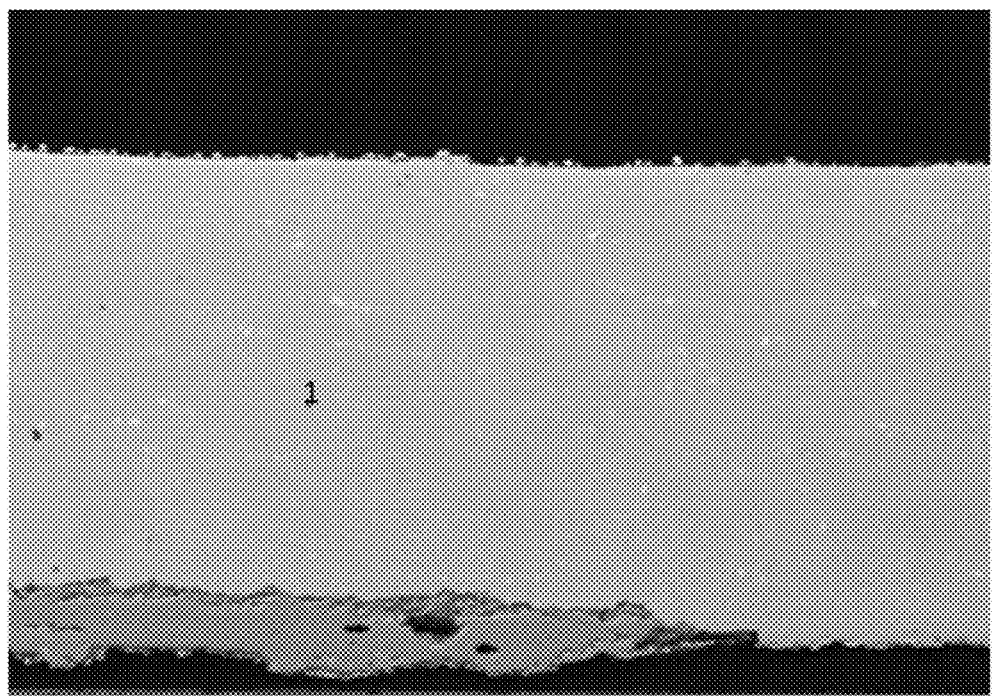
FIG. 4 shows a low magnification SEM cross section of an interconnect comprising a 200 nm layer of chromium oxide, after SOFC stack operation.

FIG. 4, however, shows an interconnect 1 after extended operation where the chromium oxide layer was less than 350 nm (200 nm). This figure evidences significant corrosion in the air side of the interconnect 1 (lower left corner) after operation. It is therefore clear that not only is the chromium oxide layer needed to prevent corrosion of the steel, illustrating the importance of the pre-heat treatment step, but also that a minimum thickness of the chromium oxide layer is preferred if corrosion of the steel is to be prevented on extended use.

Figure 5:
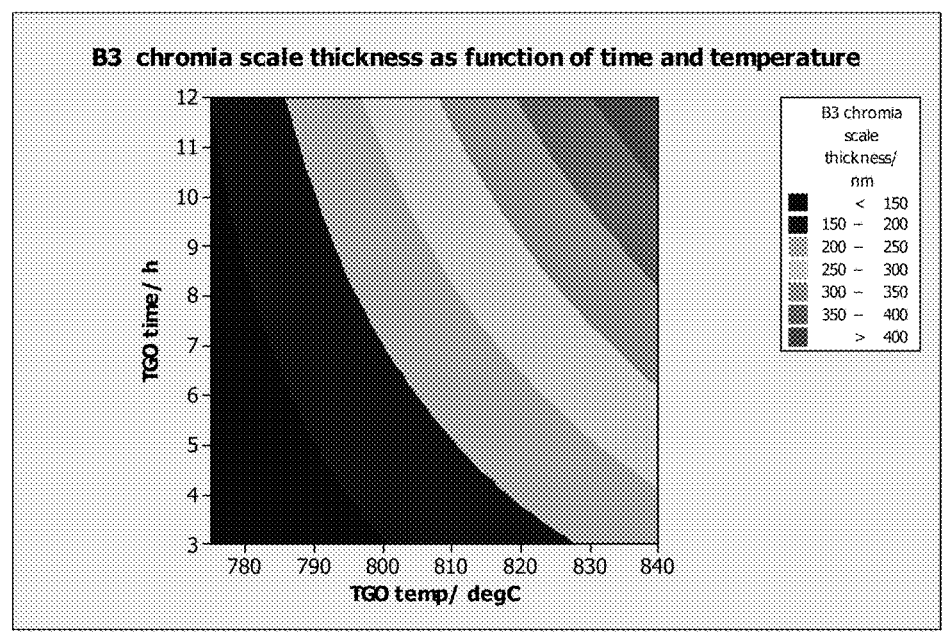
FIG. 5 is an experimentally derived contour plot for coated interconnect steel showing the chromia scale thickness as a function of the time and temperature of the heat treatment process.

FIG. 5 is a contour plot showing the thickness of the chromia scale formed as a function of the heat treatment temperature (TGO—thermogravimetric oxidation) and time.

In this figure, the optimum temperature range for the production of chromia scale of thickness greater than 350 nm is treatment for 8-12 hours in air at a temperature in the range 820-840° C.; however there can be marked variations in the temperature and timescale needed from steel batch to steel batch and the optimum conditions must be determined for each batch.

Figure 6:
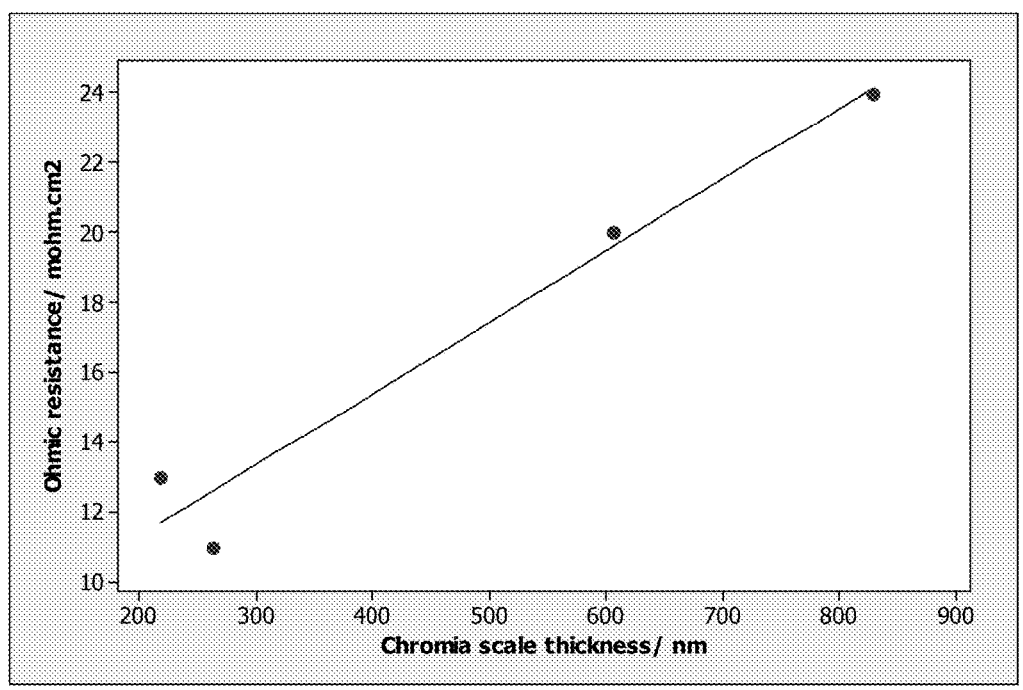
FIG. 6 is a graph showing the relationship between the chromia scale thickness on the interconnects and the measured ohmic resistance component of a working SOFC cell.

FIG. 6 shows the relationship between chromia scale thickness and resistance, clearly showing that the thicker the layer of chromia scale, the greater the resistance. As we wish to minimise resistance in the working cell, the thickness of the chromia layer should be minimised, conversely, it has been found that increasing the chromia thickness further increases the contact resistance, and the duration of heat treatment without offering any additional corrosion resistance.

Figure 7A:
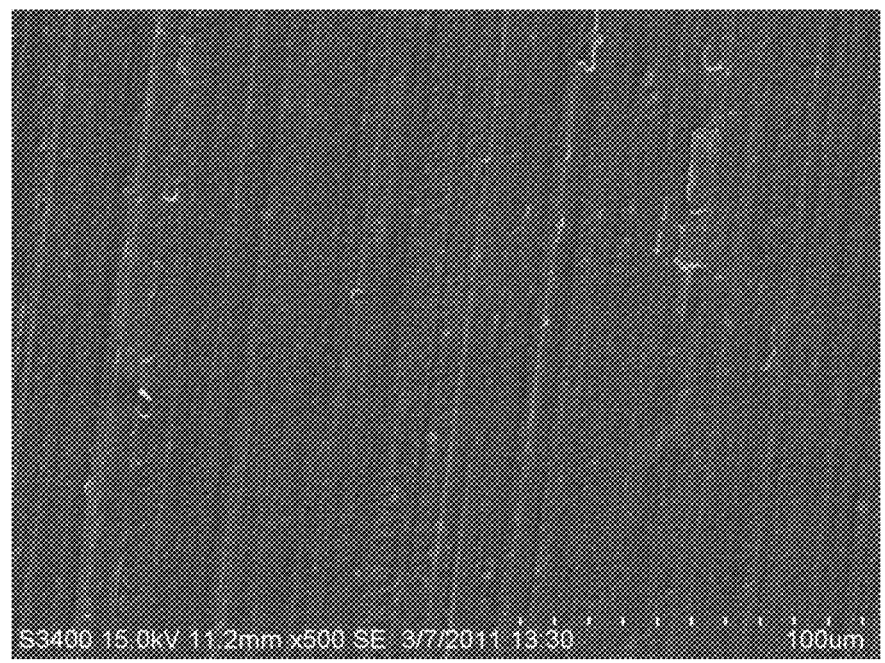
FIGS. 7a and 7b are SEM images of pre-heat treated interconnects, FIG. 7a showing surface roughness where heat treatment is at a temperature of 840° C. for 6 hours, FIG. 7b showing surface roughness where heat treatment is at a temperature of 870° C. for 3 hours.
Figure 7B:
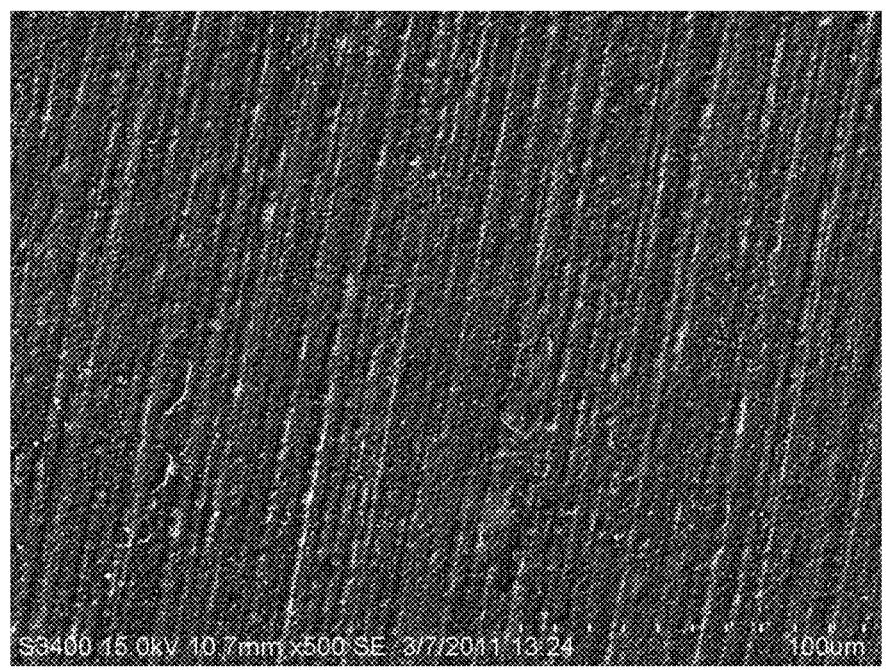

FIG. 7 shows the importance of controlling the temperature of the pre-heat treatment step. As shown in FIG. 5, below a certain temperature (around 800° C.), the chromium oxide layer will not form. However, FIG. 7 shows that above around 890° C. the morphology of the cobalt oxide layer changes from a flat smooth surface (FIG. 7*a*) to a rough surface (FIG. 7*b*). This is due to the formation of much larger crystals in the spinel structure and leads to higher electrical contact resistance for any given thickness of the chromium oxide layer.

It should be appreciated that the processes and apparatus of the invention are capable of being implemented in a variety of ways, only a few of which have been illustrated and described above. These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

We claim:

1. An interconnect for a low temperature solid oxide fuel cell, the interconnect comprising:
 a stainless steel substrate comprising a first surface and an opposed second surface for use on the an air/oxidant side and a fuel side of the interconnect, respectively;
 a layer comprising chromium oxide on the first surface of the substrate, wherein the chromium oxide layer has a thickness in the range of 350 nm to 600 nm;
 a metal oxide coating on the chromium oxide layer; and
 a continuous aluminum oxide layer directly on the second surface of the substrate, there being no intervening layer between the continuous aluminum oxide layer and the second surface.

2. The interconnect according to claim 1, wherein the chromium oxide layer is an oxide scale.

3. The interconnect according to claim 1, wherein the stainless steel comprises 17 wt % to 25 wt % chromium.

4. The interconnect according to claim 3, wherein the stainless steel is a ferritic stainless steel.

5. The interconnect according to claim 1, wherein the metal oxide comprises a metal oxide selected from cobalt oxide, manganese cobalt oxide, copper oxide or combinations thereof.

6. The interconnect according to claim 1, wherein the metal oxide coating has a thickness in the range of 0.5 μm to 20 μm.

7. The interconnect according to claim 1, wherein the chromium oxide layer has a thickness in the range of 350 nm to 500 nm.

8. The interconnect according to claim 1, wherein the chromium oxide layer has a thickness in the range of 350 nm to 450 nm.

9. The interconnect according to claim 1, wherein the metal oxide coating comprises cobalt oxide.

10. A fuel cell stack comprising at least one interconnect according to claim 1.

11. The fuel cell stack according to claim 10, wherein a cathode contact paste, or contact layer is present between the cathode and a cathode side of at least one interconnect.

12. A fuel cell stack according to claim 10, wherein the metal oxide coating is in contact with the air supplying the fuel cell.

13. A process for making an interconnect for a low temperature solid oxide fuel cell, the process comprising:
 coating a first surface of a stainless steel substrate with a metal oxide coating to form a coated substrate;
 heating the coated substrate to a temperature in the range of 800° C. to 920° C. to form a layer comprising a chromium oxide between the first surface and the metal oxide coating; and
 resulting in the interconnect for the low temperature solid oxide fuel cell comprising:
 the stainless steel substrate comprising the first surface and an opposed second surface for use on an air/oxidant side and a fuel side of the interconnect, respectively;
 the layer comprising the chromium oxide on the first surface of the substrate, wherein the chromium oxide layer has a thickness in the range of 350 nm to 600 nm;
 the metal oxide coating on the chromium oxide layer; and
 a continuous aluminum oxide layer directly on the second surface of the substrate, there being no intervening layer between the continuous aluminum oxide layer and the second surface.

14. The process according to claim 13, wherein the coated substrate is heated for a time in the range of 3 hours to 6 hours.

15. The process according to claim 13, wherein the coating is applied to the substrate by a method selected from, vapour deposition, printing, roll-to-roll processing, spraying, or combinations thereof.

16. The process according to claim 13, wherein the coating is applied to the substrate by a method comprising:
 providing a metallic layer and a reactive layer on the stainless steel substrate, allowing the metallic layer and the reactive layer to react with each other or diffuse into each other, and oxidizing the metallic layer and the reactive layer to form the metal oxide coating.

17. The process according to claim 13, wherein an interconnect form is provided by processing either prior to heating the coated substrate, or after heating the coated substrate.

\* \* \* \* \*